US010753773B2

(12) United States Patent
Morrison et al.

(10) Patent No.: US 10,753,773 B2
(45) Date of Patent: Aug. 25, 2020

(54) DISPLAY DEVICE RELATIVE ANGLE DETECTION SYSTEM

(71) Applicant: Dell Products L.P., Round Rock, TX (US)

(72) Inventors: John Trevor Morrison, Round Rock, TX (US); Jace William Files, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 225 days.

(21) Appl. No.: 15/851,098

(22) Filed: Dec. 21, 2017

(65) Prior Publication Data

US 2019/0195664 A1 Jun. 27, 2019

(51) Int. Cl.
*G01D 5/353* (2006.01)
*G09G 3/20* (2006.01)
*G01D 3/036* (2006.01)
*G09G 3/3208* (2016.01)

(52) U.S. Cl.
CPC ....... *G01D 5/35345* (2013.01); *G01D 3/0365* (2013.01); *G09G 3/2092* (2013.01); *G09G 3/3208* (2013.01); *G09G 2370/18* (2013.01)

(58) Field of Classification Search
CPC . G01D 5/35345; G09G 3/2092; G09G 3/3208
See application file for complete search history.

(56) References Cited

U.S. PATENT DOCUMENTS

| 2007/0286556 A1* | 12/2007 | Kassamakov | G06F 1/1616 |
| | | | 385/88 |
| 2011/0007101 A1* | 1/2011 | Mori | G09G 3/3208 |
| | | | 345/690 |

\* cited by examiner

*Primary Examiner* — Georgia Y Epps
*Assistant Examiner* — Don J Williams
(74) *Attorney, Agent, or Firm* — Haynes and Boone, LLP

(57) ABSTRACT

A angle detection system, includes a first member pivotally coupled to a second member. An optical cable connecting an optical transmitter provided on the first member and an optical receiver provided on the second member is used by an angle detection engine to determine signal loss of an optical signal provided by the optical transmitter through the optical cable to the optical receiver. The angle detection engine then determines, based on the signal loss, a first angle of the second member relative to the first member. The angle detection engine then performs an instruction based on the first angle.

18 Claims, 14 Drawing Sheets

DISPLAY DEVICE RELATIVE ANGLE DETECTION SYSTEM

BACKGROUND

The present disclosure relates generally to information handling systems, and more particularly to detecting the relative angle of a display device in information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems such as, for example, laptop/notebook computing devices, convertible laptop/tablet computing devices, mobile phones, and/or other computing devices known in the art, include a plurality of chassis members that are moveable into multiple orientations to provide for a variety of configurations of the computing device. For example, convertible laptop/tablet computing devices include a base member that is moveably coupled to a display member by a hinge system that allows the display member to move relative to the base member to provide the convertible laptop/tablet computing device in a closed configuration (e.g., with the display member located immediately adjacent the base member and the display screen facing the base member), a laptop configuration (e.g., with the display screen oriented at an angle of approximately 90-135 degrees relative to the base member), and a tablet configuration (e.g., with the display member located immediately adjacent the base member and the display screen facing a direction opposite the base member). Similarly, emerging organic light emitting diode (OLED) display devices may include a flexible display portion that may be folded or bent like a laptop/tablet computing device such that the OLED display device may be provided in a closed configuration, a laptop configuration, a tablet configuration, and other configurations that are enabled by flexible OLED display devices without the need for a hinge system.

When provided in its various configurations, the computing device may use the angle of the display member relative to the base member to perform some actions. For example, when the computing device is in a closed configuration that is associated with a zero degree angle of the display member relative to the base member, the computing device may be configured to enter into a sleep mode. In another example, an angle of the display member relative to the base member that indicates that the computing device is in the laptop configuration may be used to cause the display to provide a display screen output associated with a first orientation, while an angle of the display member relative to the base member that indicates that the computing device is in the tablet configuration may be used to cause the display to provide a display screen output associated with a second orientation that is different from the first orientation. The angle of the display member relative to the base member may also be used for enabling or disabling many other functions and/or providing a variety of user experiences known in the art. Conventional display device angle detection systems include encoder wheels and accelerometers that are integrated with the hinge of the computing device, and fail to provide accurate angle detection under all circumstances. For example, a dual 9-axis sensor used for conventional display device angle detection may not detect the angle of the display member in relation to the base member when the computing device is in oriented in a "book" orientation (i.e., the computing device is being held as if it were a book).

Accordingly, it would be desirable to provide an improved display device angle detection system.

SUMMARY

According to one embodiment, an information handling system (IHS) includes: a display chassis that houses a display device; a base chassis that houses a processing system; an optical cable connecting each of the display device and the processing system; and a memory system that includes instruction that, when executed by the processing system, causes the processing system to provide an angle detection engine that is configured to: determine signal loss of an optical signal provided by the processing system through the optical cable to the display device; determine, based on the signal loss, a first angle of the display chassis relative to the base chassis; and perform, based on the first angle, an instruction.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
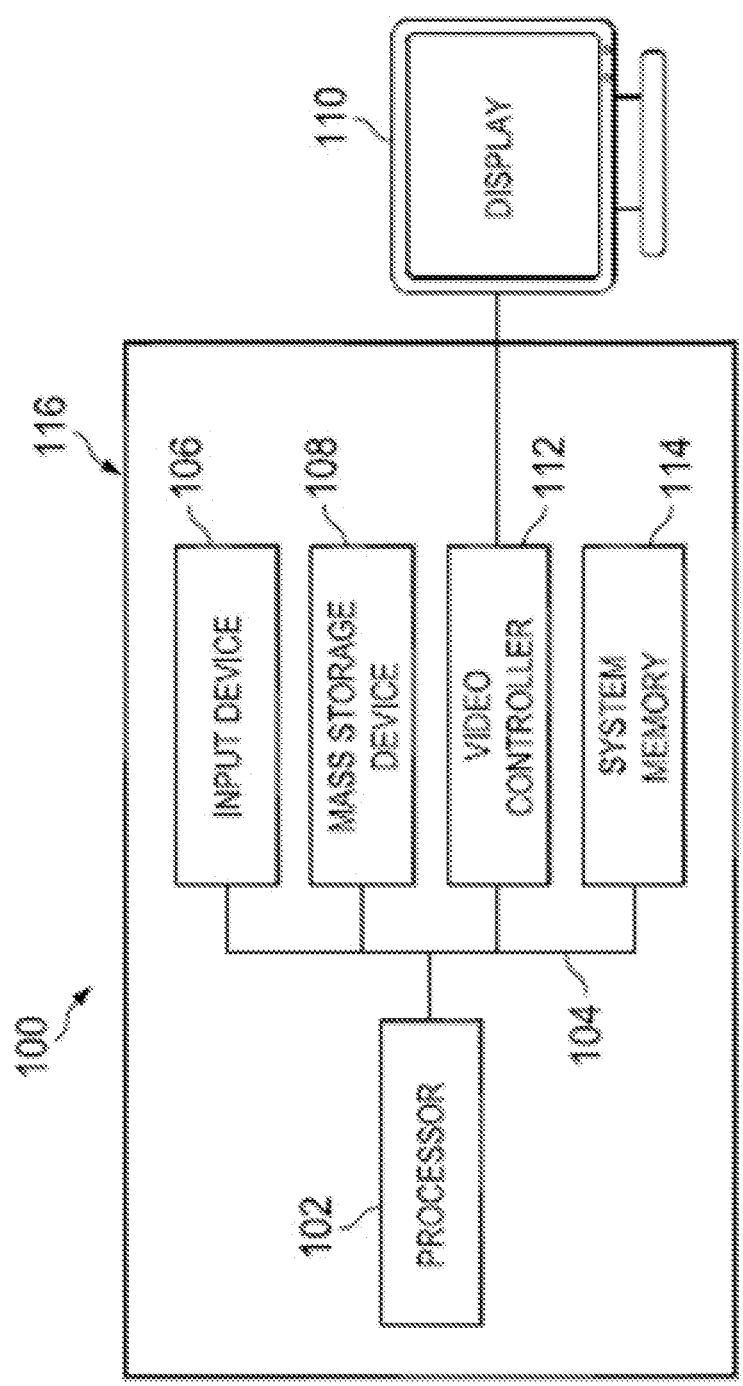
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2A:
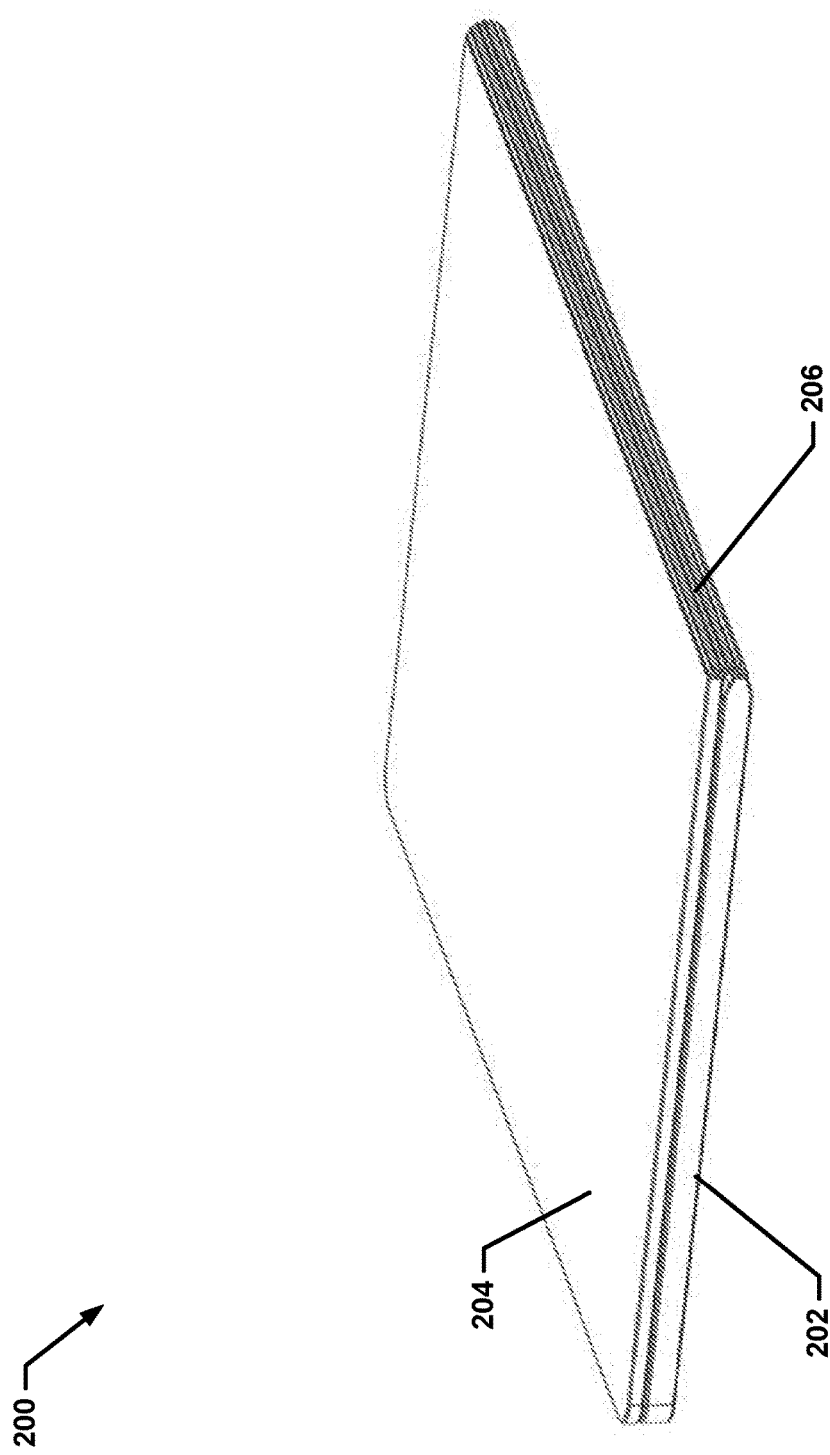
FIG. 2A is a perspective view illustrating an embodiment of a computing device in a closed configuration.
Figure 2B:
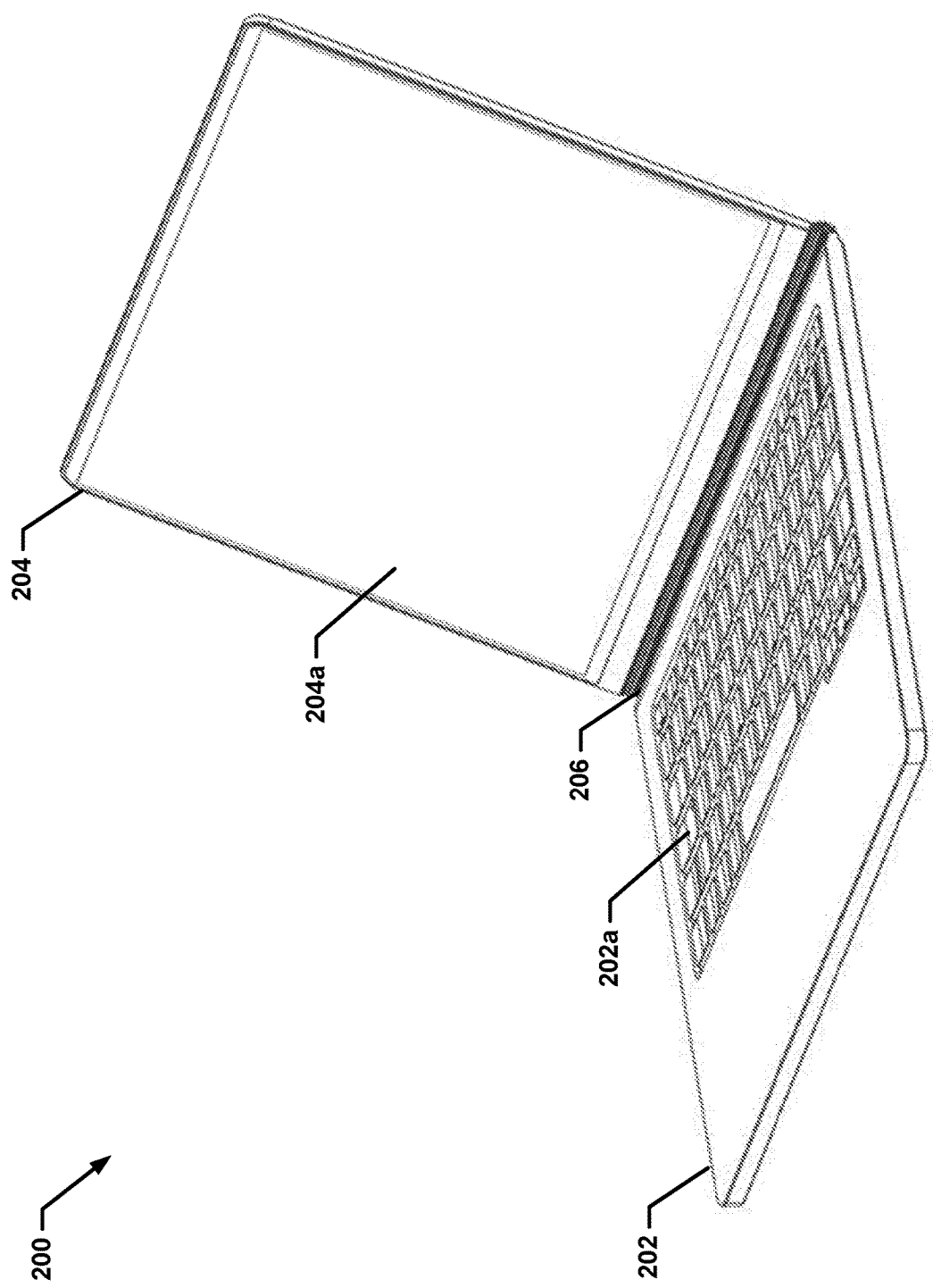
FIG. 2B is a perspective view illustrating an embodiment of the computing device of FIG. 2A in a laptop/notebook configuration.
Figure 2C:
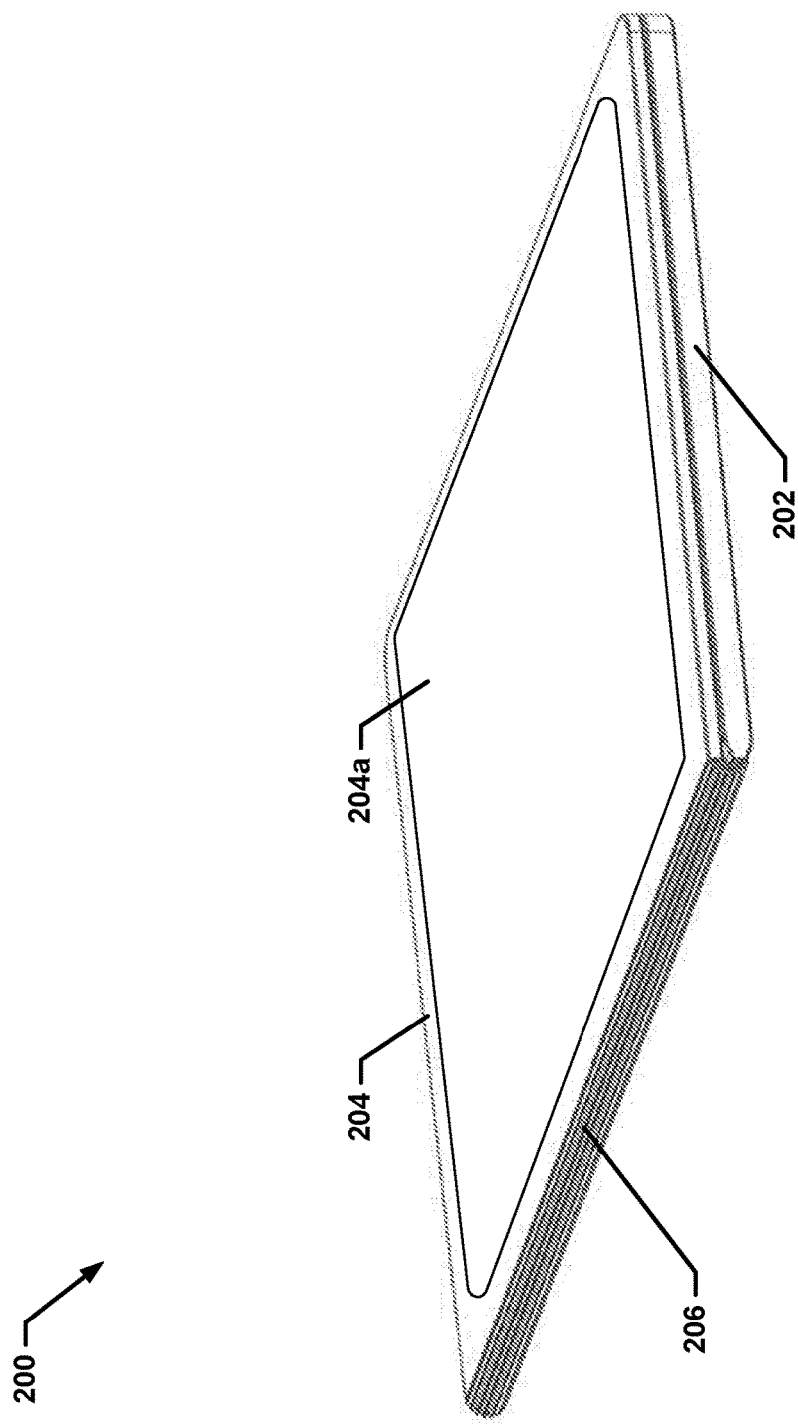
FIG. 2C is a perspective view illustrating an embodiment of the computing device of FIG. 2A in a tablet configuration.

Referring now to FIGS. 2A, 2B, and 2C an embodiment of a computing device 200 is illustrated that utilizes the relative angle detection system of the present disclosure. However, systems other than computing systems are envisioned as benefitting from use of the relative angle detection system of the present disclosure, and thus those systems are envisioned as falling within the scope of the present disclosure as well. In the illustrated embodiment, the computing device 200 is provided by a convertible laptop/tablet computing device (discussed in further detail below) that includes a base member 202 that may house a processing system (not illustrated, but which may include the processor 102 discussed above with reference to FIG. 1), a memory system (not illustrated, but which may include the memory 114 discussed above with reference to FIG. 1), and/or any of the other components of the IHS 100 discussed above with reference to FIG. 1, including the input device(s) 202a that may be provided by the input device 106 discussed above with reference to FIG. 1. The computing device 200 also includes a display member 204 that houses a display device 204a that may be the display 110 discussed above with reference to FIG. 1. The base member 202 and the display member 204 are moveably coupled together by a hinge system 206 that may be provided by any of the teachings (or combinations thereof) discussed below. As discussed below, the hinge system 206 may provide for a plurality of different configurations of the base member 202 and the display member 204, including the closed configuration A that is illustrated in FIG. 2A, the laptop/notebook configuration B illustrated in FIG. 2B, and the tablet configuration C illustrated in FIG. 2C.

While the computing device 200 is described herein as including a base member 202 and a display member 204, the computing device 200 may be a flexible organic light emitting diode (OLED) display device that provides the computing device 200 as a single member (e.g., a tablet computing device) that is flexible and does not include a "hinge". Thus, when referring to the base member 202 and the display member 204, a base chassis and a display chassis, and/or a first member and a second member herein, the base member 202 may include a first portion of the computing device 200 that is adjacent a bend in the single member computing device/flexible OLED device, while the display member 204 may include a second portion of the single member computing device that is adjacent to and opposite that bend from the base member 202. Thus, the "hinge angle" described herein should not be limited to the angle of a hinge, but rather may encompass the relative angle at which any first member is orientated relative to a second member. Furthermore, while the examples below illustrate a display device 204a located in the display member 204, in other embodiments the base member 202 may house a portion of the display device 204a, and/or the base member 202 and/or the display member 204 may house a second display device (as well as other components) that will fall within the scope of the present disclosure as well.

Figure 3A:
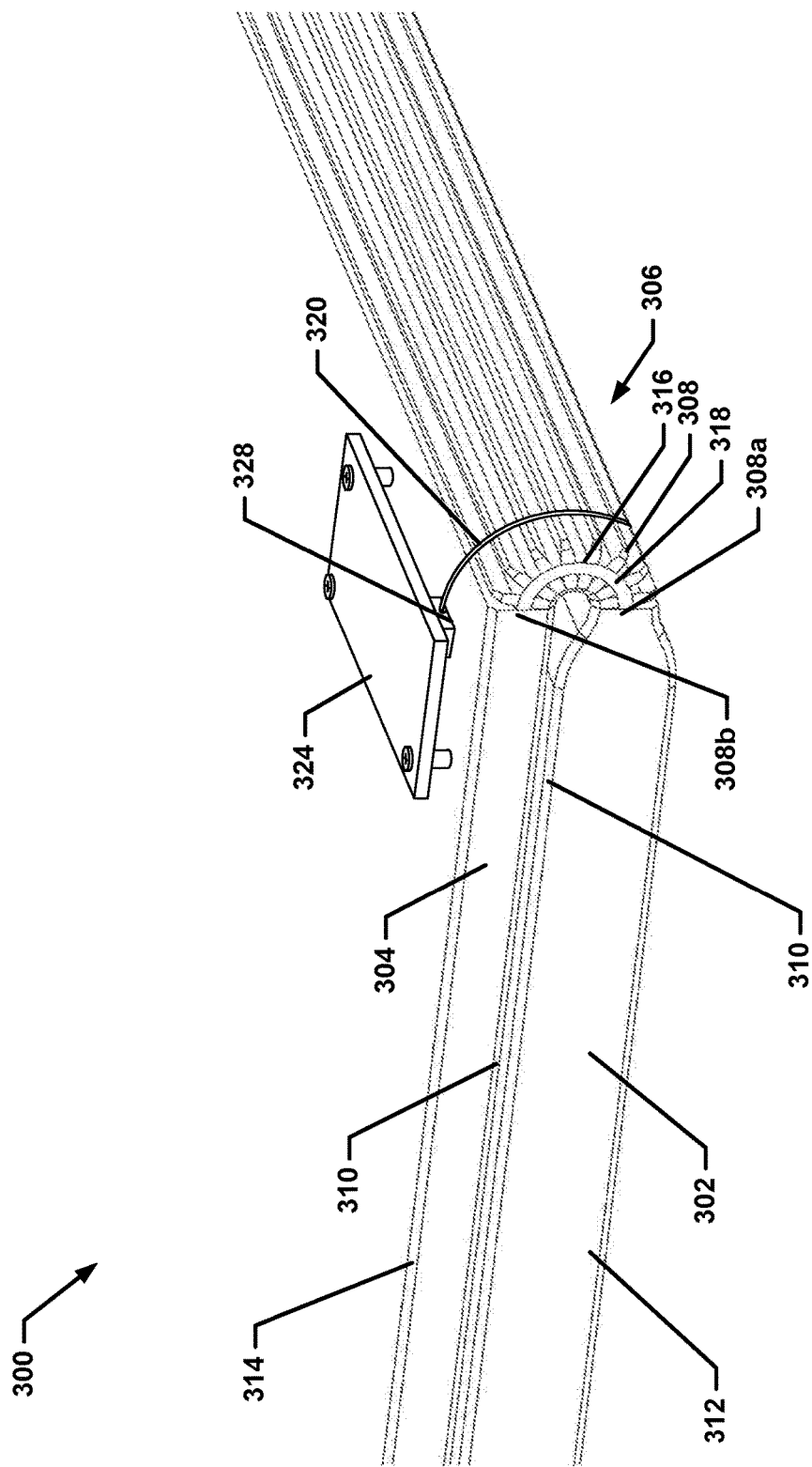
FIG. 3A is a perspective view illustrating an embodiment of a relative angle detection system included on the computing device 200 of FIGS. 2A-2C.
Figure 3B:
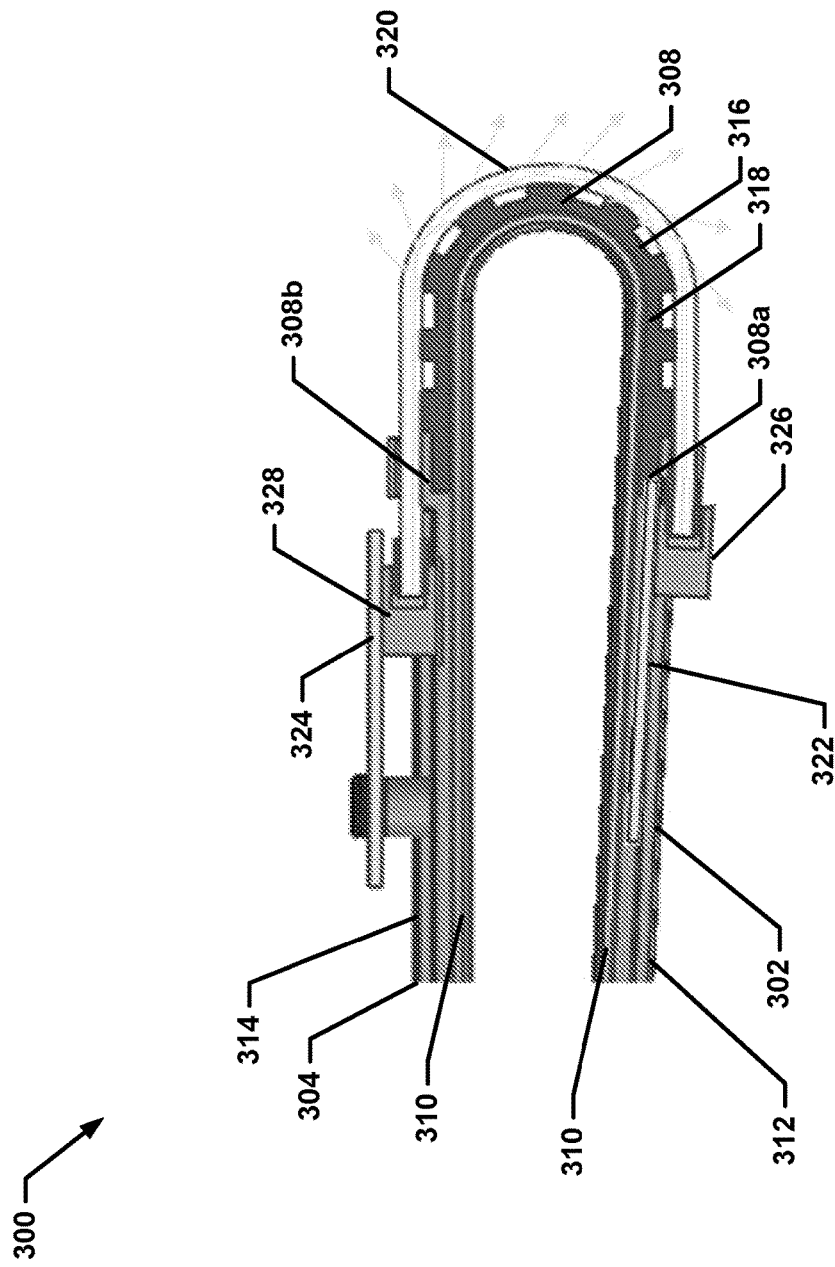
FIG. 3B is a cross sectional view of the relative angle detection system of FIG. 3A.
Figure 3C:
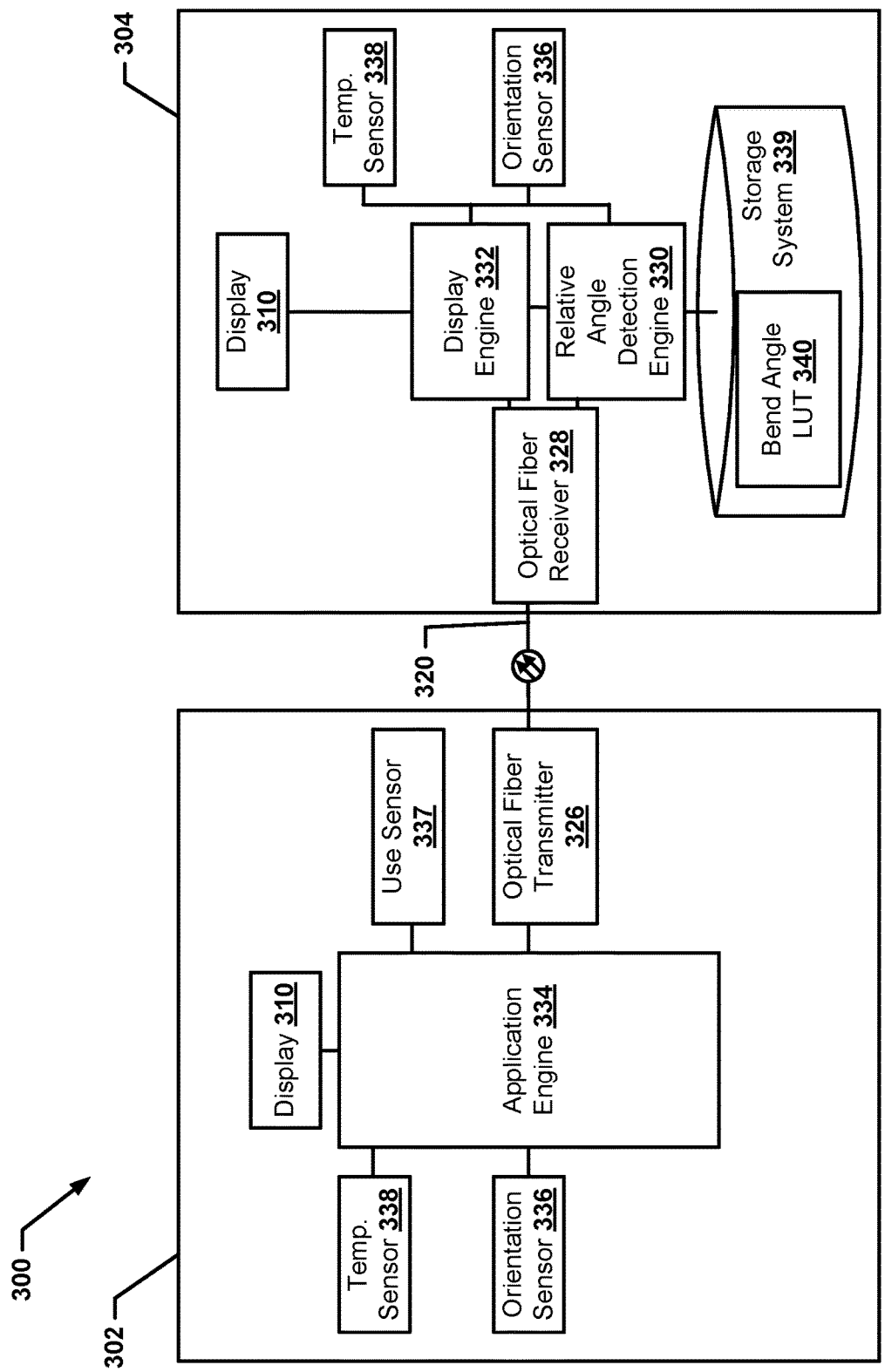
FIG. 3C is a schematic view illustrating an embodiment of the relative angle detection system of FIG. 3A.

Referring now to FIGS. 3A, 3B, and 3C an embodiment of a relative angle detection system 300 according to the teachings of the present disclosure is illustrated. The relative angle detection system 300 is described below as being provided in the convertible computing device 200 discussed above with reference to FIGS. 2A-2C, and provides a simplified example that allows for discussion of some concepts employed in the systems and methods of the present disclosure, although as discussed below the embodiment of the relative angle detection system 300 illustrated in FIGS. 3A-3C may be utilized with a flexible tablet computing device with little (if any) modification. While described as a "hinge angle detection system", the teachings of the present disclosure are envisioned as enabling a variety of moveable couplings other than hinges, and thus the application of the teachings of the present disclosure to those moveably couplings are envisioned as falling within the scope of the present disclosure as well. The relative angle detection system 300 includes a hinge 306 having a flexible base 308 with a first end 308a that may be connected to a first chassis member 302 such as a first portion of a flexible tablet computing device or the base member 202 of FIG. 2A-2C, and a second end 308b that may be connected to a second chassis member 304 such as a second portion of a flexible tablet computing device or the display member 204 of FIG. 2A-2C. In such embodiments, a flexible display 310 may extend between the first chassis member 302 and the second chassis member 304, and over the flexible base 308. For example, the flexible display 310 may include an OLED display screen, and/or any other flexible display screen apparent to one of skill in the art in possession of the present disclosure. The first chassis member 302 defines a first chassis member housing 312 that may house any of the components (e.g., computing device components) discussed above, and the second chassis member 304 defines a second chassis member housing 314 that may house any of the display subsystems (e.g., a display device) discussed above. The hinge 306 includes a hinge chassis 316 that defines a hinge housing 318 that houses the hinge components of the hinge 306, only some of which are illustrated in FIGS. 3A and 3B.

In various embodiments, the relative angle detection system 300 may include a cable 320 that extends between subsystem components housed in the second chassis member 304 and subsystem components housed in the first chassis member 302. For example, the cable 320 may be a display cable that extends between display subsystem components in the display member 204 of FIGS. 2A-2C (e.g., extending from the display device 204a via, for example, a circuit board or bus) and computing system components in the base member 202 (e.g., extending from the processing system via, for example, a circuit board or bus). In an embodiment, the cable 320 may be an optical fiber cable that includes at least one optical fiber that is configured to carry light. For example, the optical fiber cable may be a single-mode fiber (SMF), which has a core radius of 4 um-10 um and a cladding radius of 100 um-117 um (for a total radius of ~125 um). The optical fiber cable may configured to provide wavelengths that will have high losses which will be easier to measure the power delta losses with respect to bend radius (e.g. 1330 nm will have better angle resolution (higher losses) than 1550 nm). The cable 320 may be coupled to the first chassis member 302, the second chassis member 304, and/or other components in the system 300 such that the cable 320 is configured to bend as the first chassis member 302 rotates relative the second chassis member 304 about the hinge 306 to provide various angles between the first chassis member 302 and the second chassis member 304. For example, a portion of the cable 320 may be routed about the hinge 306 on the exterior of the hinge chassis 316, as illustrated in FIGS. 3A and 3B. However, in various embodiments, that portion the cable 320 may be routed through the hinge 306 and within the hinge housing 318. Similarly, as illustrated in FIGS. 3A and 3B, a portion of the cable 320 may be routed on the exterior of the second chassis member 304. However, in various embodiments, that portion of the cable 320 may be routed through the second chassis member housing 314. Furthermore, a portion of the cable 320 may be routed through the first chassis member housing 312 as illustrated in FIG. 3B. However, in various embodiments that portion of the cable 320 may be routed along the exterior of the first chassis member 302.

Thus, in an example, the cable 320 is coupled to a first computing device component (e.g., the processing system via a first circuit board 322) that is housed in the first chassis member housing 312, extends between the first chassis member 302 and the hinge 306, is routed through and/or about the hinge chassis 316, extends between the hinge chassis 316 and the second chassis member 304, and is coupled to a second computing device component (e.g., the display device via a second circuit board 324) housed in the second chassis member housing 314. However, one of skill in the art in possession of the present disclosure will recognize that other cable configurations that provide the hinge orientation detection functionality discussed below will fall within the scope of the present disclosure as well. For example, in situations where the hinge 306 would not change the bend radius of the cable 320 when rotation of the hinge occurs, the cable 320 may be routed around or along a gear system such that, as the angle of the second chassis member 304 relative to the first chassis member 302 changes, the cable 320 increases or decreases in the number of turns to allow the use of the bend distance or number of turns of the cable 320 in determining the relative angle of the first chassis member 302 and the second chassis member 304. In other examples, the cable 320 may be configured relative to the hinge such that the cable 320 experiences torsion (e.g., twists and untwists) as the angle of the second chassis member 304 changes relative to the first chassis member 302.

As stated above, the cable 320 may be coupled to the first computing device component and the second computing device component through a first circuit board 322 and the second circuit board 324. As illustrated in FIG. 3B, the first circuit board 322 may be housed in the first chassis member housing 312. However, in other examples, the first circuit board 322 may be coupled to the exterior of the first chassis member 302. Similarly, as illustrated in FIGS. 3A and 3B, the second circuit board 324 may be coupled to the exterior of the second chassis member 304. However, in other examples, the second circuit board 324 is housed in the second chassis member housing 314. The first circuit board 322 may include an optical transmitter 326 that is configured to convert received electrical signals from first computing device components to optical signals that can be provided over the cable 320. Likewise, the second circuit board 324 may include an optical receiver 328 that is configured to receive optical signals through the cable 320 and convert those optical signals to electrical signals that may be used by the second computing device components housed in the second chassis member housing 314. Furthermore, the optical transmitter 326 and/or the optical receiver 328 may be slidably coupled to their respective first circuit board 322 and second circuit board 324 such that the distance between the optical transmitter 326 and/or the optical receiver 328 may vary as the distance between the optical transmitter 326 and the optical receiver 328 changes due to the bending of cable 320 in response to the bending of the hinge 306. While the first circuit board 322 is described as including the optical transmitter 326, and the second circuit board 324 is described as including the optical receiver 328, one skill in the art will recognize that the first circuit board 322 may include the optical receiver 328 while the second circuit board 324 may include the optical transmitter 326, or that the first circuit board 322 and the second circuit board 324 may each include optical transceivers that are configured to both transmit and receive optical signals and provide the necessary conversions between optical signals and electrical signals.

As discussed above, the relative angle detection system 300 includes a first chassis member 302 that may be the base member 202 of FIGS. 2A-2C, and a second chassis member 304 that may be the display member 204 of FIGS. 2A-2C. As such, the relative angle detection system 300 may be the IHS 100 discussed above with reference to FIG. 1 and/or may include some or all of the components of the IHS 100. The first chassis member 302 defines the first chassis member housing 312 that may house any of the first computing device components (e.g., computing device components), and the second chassis member 304 defines the second chassis member housing 314 that may house any of the second computing device components (e.g., a display device) discussed above and as illustrated in FIG. 3C. For example, the second chassis member housing 314 may house a processing system (not illustrated, which may be provided by the processor 102 discussed above with reference to FIG. 1, a microcontroller unit, a controller circuit, and/or any other processing systems known in the art) and a memory system (not illustrated, which may include system memory 114 discussed above with reference to FIG. 1). The memory system is coupled to the processing system and may include instructions that, when executed by the processing system, cause the processing system to provide a relative angle detection engine 330 that is configured to perform the functionality of the relative angle detection engines and relative angle detection systems, as well as any other functionality, discussed below. In various embodiments, the memory system may include instructions that, when executed by the processing system, cause the processing system to provide a display engine 332 that is configured to perform the functions of the display engines and computing devices discussed below. In a specific example, the processing system may include a graphics processing unit (GPU) that is configured to render content information and input information on the flexible display 310 and/or the display device 204a of FIGS. 2A-2C.

Similarly, the first chassis member housing 312 may house a processing system (not illustrated, which may be provided by the processor 102 discussed above with reference to FIG. 1) and a memory system (not illustrated, which may include system memory 114 discussed above with reference to FIG. 1). The memory system is coupled to the processing system and may include instructions that, when executed by the processing system, cause the processing system to provide an application engine 334 that is configured to perform the functionality of the application engine and relative angle detection systems, as well as any other functionality, discussed below. While the relative angle detection engine 330 and the display engine 332 are described as being provided in the second chassis member housing 314 and the application engine 334 is described as being provided in the first chassis member housing 312, one of skill in the art in possession of the present disclosure will recognize that each of the relative angle detection engine 330, the display engine 332, and/or the application engine 334 may be provided in the first chassis member housing 312 and/or the second chassis member housing 314.

As discussed above, the second chassis member housing 314 may house the optical receiver 328 that is coupled to the relative angle detection engine 330 and/or the display engine 332. The optical receiver 328 may be coupled to the optical transmitter 326 provided in the first chassis member housing 312 via the cable 320. In an example, the optical receiver 328 may provide electrical signals, converted from optical signals received through the cable 320, to the display engine 332 such as to facilitate communication between the display engine 332 and the components housed in the first chassis member housing 312 (e.g., the application engine 334), and provide an optical signal loss and/or a gain control signal to the relative angle detection engine 330 as discussed below.

Figure 4:
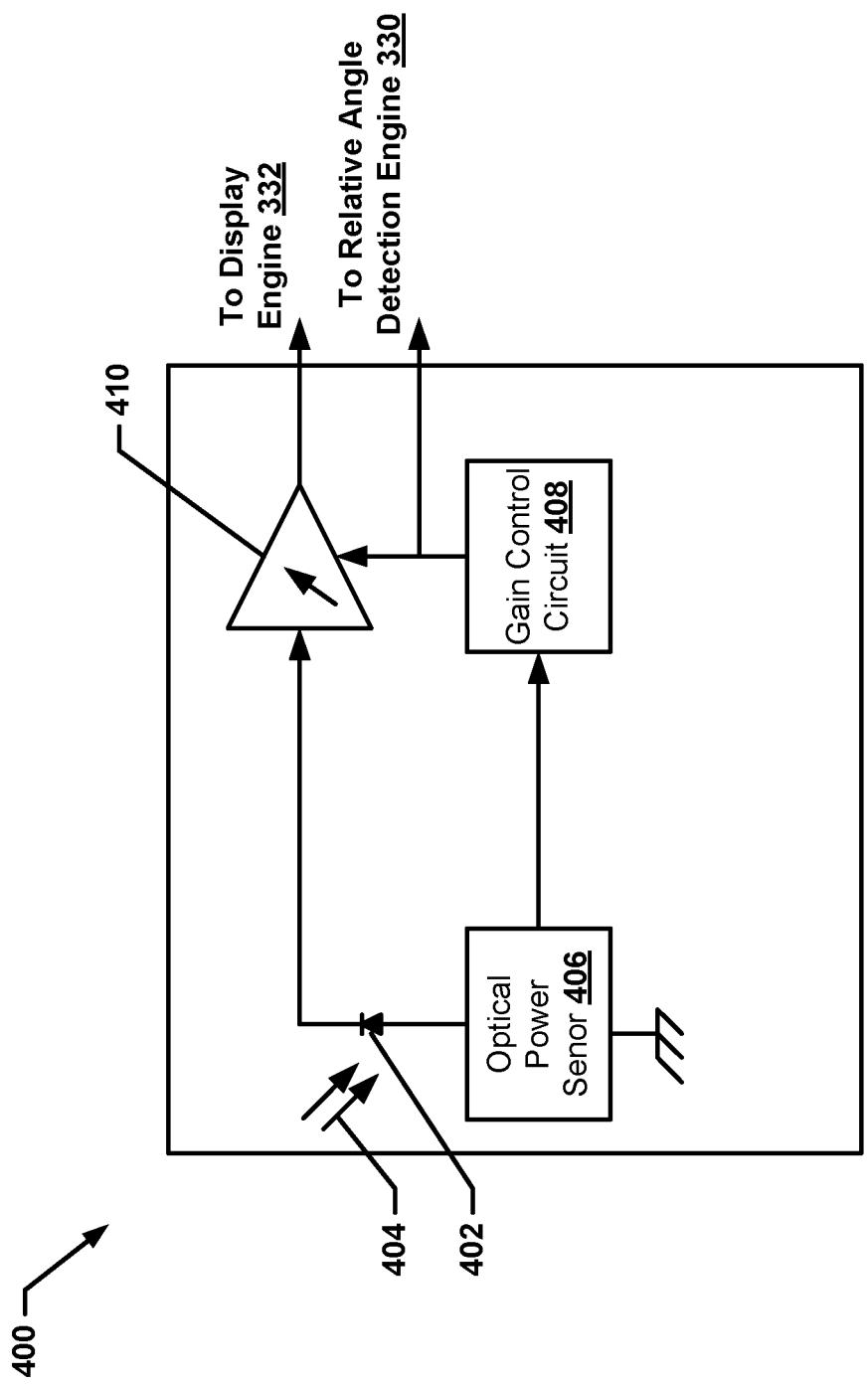
FIG. 4 is a schematic view illustrating an embodiment of an automatic gain control circuit included in an optical receiver of FIG. 3C.
Figure 5:
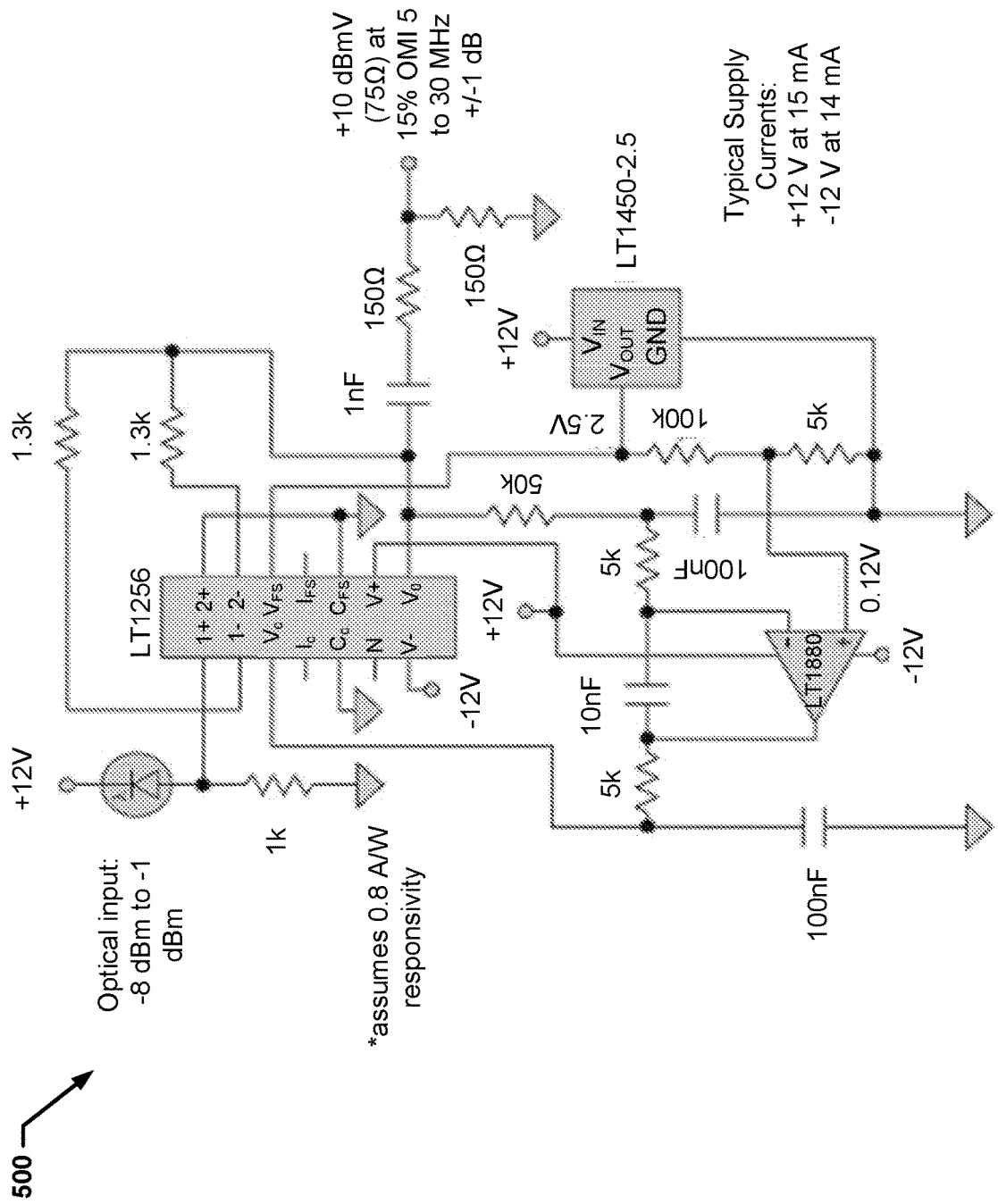
FIG. 5 is a circuit diagram illustrating an embodiment of the optical receiver of FIG. 3C.

In an embodiment, the relative angle detection engine 330 may be coupled to the optical receiver 328 and configured to detect the signal loss of the optical signal received by the optical receiver 328. In one example, with reference to FIG. 4, the relative angle detection engine 330 may be coupled to an automatic gain control circuit 400 that is included in the optical receiver 328. The automatic gain control circuit 400 may include a photodiode 402 that receives an optical signal 404 from the cable 320 and converts that optical signal 404 to an electrical signal. An optical power sensor 406 may detect the average level of incoming light power at the photodiode 402, and provide an optical sense signal indicating the average level of the incoming light power to the gain control circuit 408. The gain control circuit 408 may be configured to adjust the variable gain receiver 410 by providing a gain control signal (e.g., a gain control voltage) to the variable gain receiver 410. Thus, more light received at the photodiode 402 means that the gain control voltage is reduced, and that there is less loss in the optical signal. Referring to FIG. 5, a more detailed circuit diagram is illustrated of an optical transceiver (e.g., the optical receiver 328) that includes the automatic gain control circuit of FIG. 4. The relative angle detection engine 330 may be configured to retrieve the gain control signal and use that gain control signal to determine a bend radius of the cable 320 that may be associated with the angle of the first chassis member 302 relative to the second chassis member 304, as discussed in more detail below.

Referring back to FIG. 3C, the first chassis member housing 312 and/or the second chassis member housing 314 may also house an orientation sensor 336 that is coupled to the relative angle detection engine 330, the display engine 332, and/or the application engine 334. The orientation sensor 336 may include an accelerometer, a gyroscope, and/or any other sensor for detecting and/or calculating the orientation and/or movement of the first chassis member 302, the second chassis member 304, and/or other components in the relative angle detection system 300. The first chassis member housing 312 and/or the second chassis member housing 314 may include a use sensor 337 coupled to the application engine 334. In an example, the use sensor 337 may include a Hall effect sensor that is configured to provide a signal to the application engine 334 that indicates that the first chassis member 302 and the second chassis member 304 have moved from the closed configuration A to, for example, a laptop/tablet configuration B, and/or any open configuration other than the closed configuration A.

The first chassis member housing 312 and/or the second chassis member housing 314 may also house a storage device (not illustrated, but which may be the storage device 108 discussed above with reference to FIG. 1) that provides a storage system 339 that is configured to store relative angle lookup tables 340 that may include associations between relative angles at which the hinge 306 positions the second chassis member 304 relative to the first chassis member 302, with bend radii of the cable 320. The bend radius of the cable 320 may be associated with a gain control signal provided by the automatic gain control circuit 400 included in the optical receiver 328, and/or an optical signal loss of an optical signal that was transmitted over the cable 320. In various embodiments, the storage system 339 may store display applications that are executed by the display engine 332, and/or other applications that may be executed by the application engine 334 that is provided by the processing system that may also provide the hinge angle detection engine 330 and the display engine 332, and/or the any other data utilized by components in the relative angle detection system 300. While a specific embodiment of the relative angle detection system 300 is illustrated and described herein, one of skill in the art in possession of the present disclosure will recognize that a wide variety of modification to the components and configuration of the relative angle detection system 300 will fall within the scope of the present disclosure as well.

Figure 6:
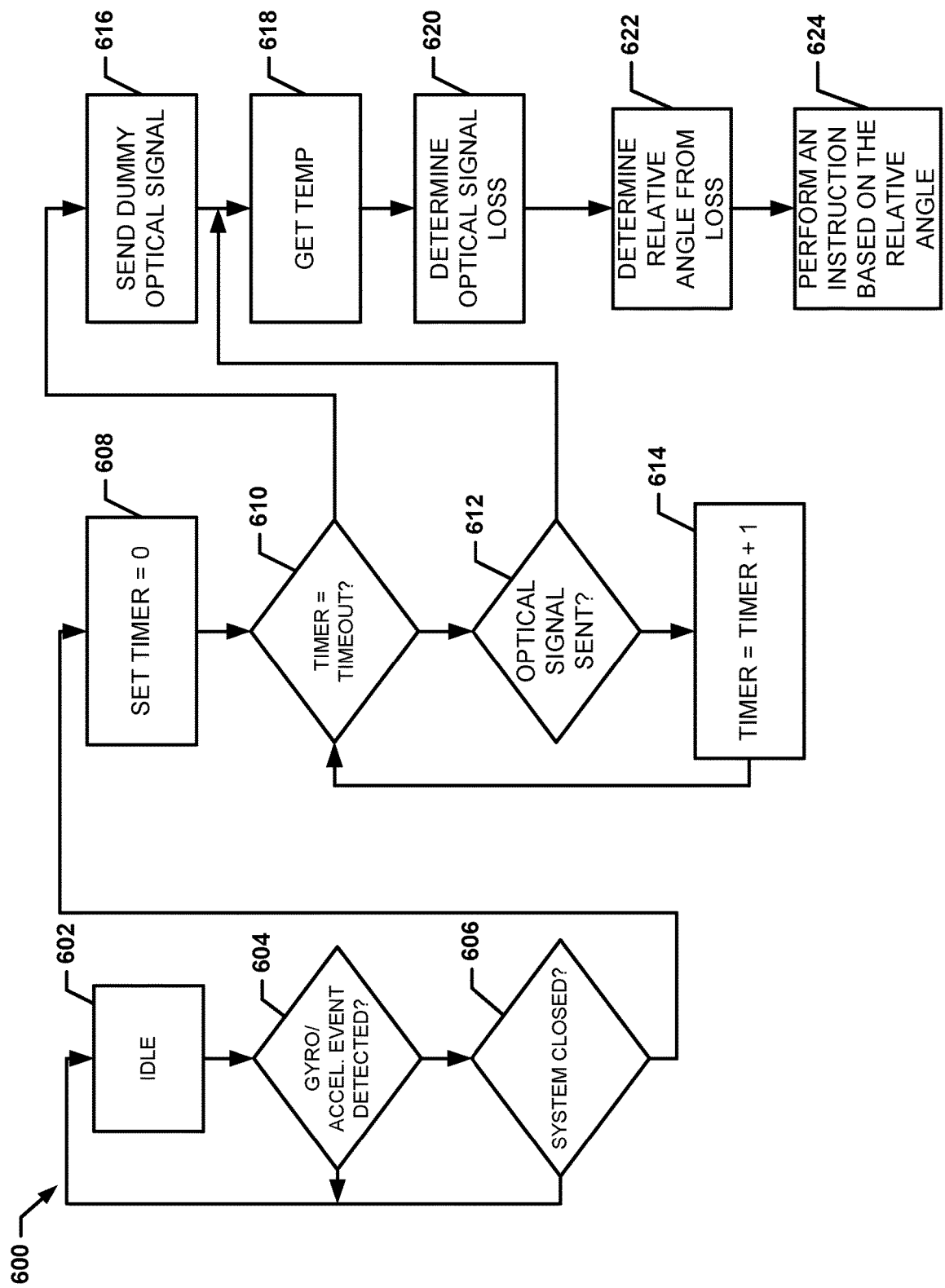
FIG. 6 is a flow chart illustrating an embodiment of a method for determining a relative angle.

Referring now to FIG. 6, a method 600 for determining a relative angle is illustrated. As discussed above, conventional hinge angle detection systems (e.g., encoder wheels) in computing devices depend on integration of hinge angle detection systems with the hinge and, in some situations, will not provide for accurate angle detection. For example, a dual 9-axis sensor may not detect the angle of the display member relative to the base member when the computing device is in a "book" orientation (i.e., the computing device is being held like a book). Furthermore, these conventional hinge angle detection systems require extra hardware, which may be difficult to implement in computing devices with low profile designs. It has been discovered that the bending of an optical cable provides a degree of optical signal loss that depends on the extent of the optical cable's bend radius, and may be utilized to determine the relative angle between two members. For example, with reference to the graph 700 in FIG. 7, an experimental embodiment of an optical fiber cable (which may be the cable 320 discussed above) was provided with a refractive index of n1=1.48 and n2=1.46, and was used to transmit an optical signal at a wavelength of 1550 μm. As can be seen in the graph 700, as the bending radius of an optical cable decreases, the amount of optical signal loss due to the bending increases. The systems and methods of the present disclosure leverage this optical cable to provide a relative angle detection system that includes an optical fiber cable providing communication between a base member and a display member of a computing device, with the optical cable routed through a hinge that connects the base member and the display member such that the optical fiber cable bends as the display member is moved relative to the base member via the hinge. Based on an optical signal loss of an optical signal provided over the optical fiber cable, the relative angle detection system may determine a bend radius of the cable, and based on that bend radius and the known dimensions and configuration of the base member, the display member, and the hinge, the relative angle detection system of the present disclosure may determine the angle at which the display member is relative to the base member.

Figure 8A:
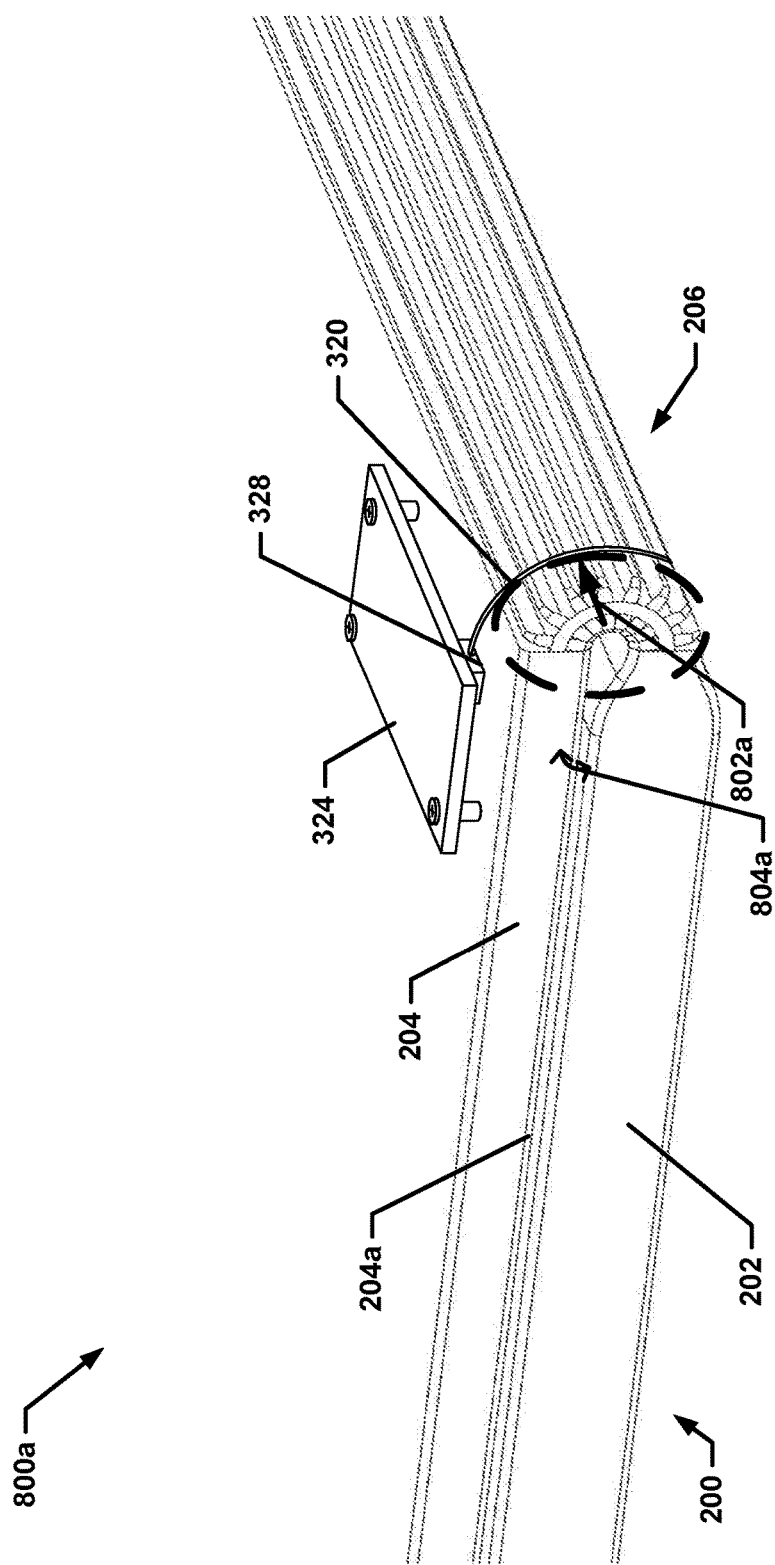
FIG. 8A is a perspective view illustrating an embodiment of the relative angle detection system of FIGS. 3A-3C including the computing device of FIGS. 2A-2C when that computing device is in a closed configuration.
Figure 8B:
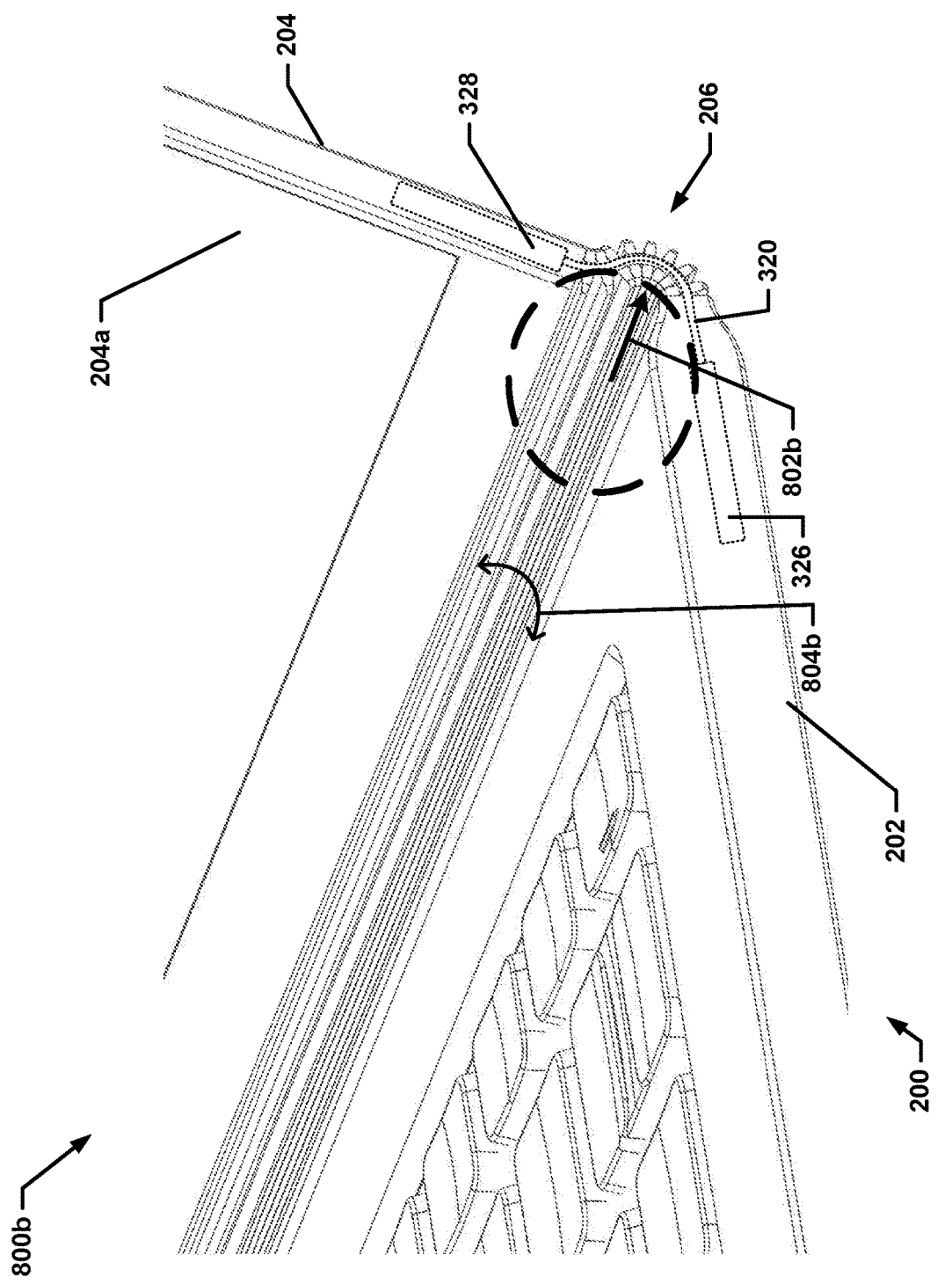
FIG. 8B is a perspective view illustrating an embodiment of the relative angle detection system of FIGS. 3A-3C including the computing device of FIGS. 2A-2C when that computing device is in a laptop/notebook configuration.
Figure 8C:
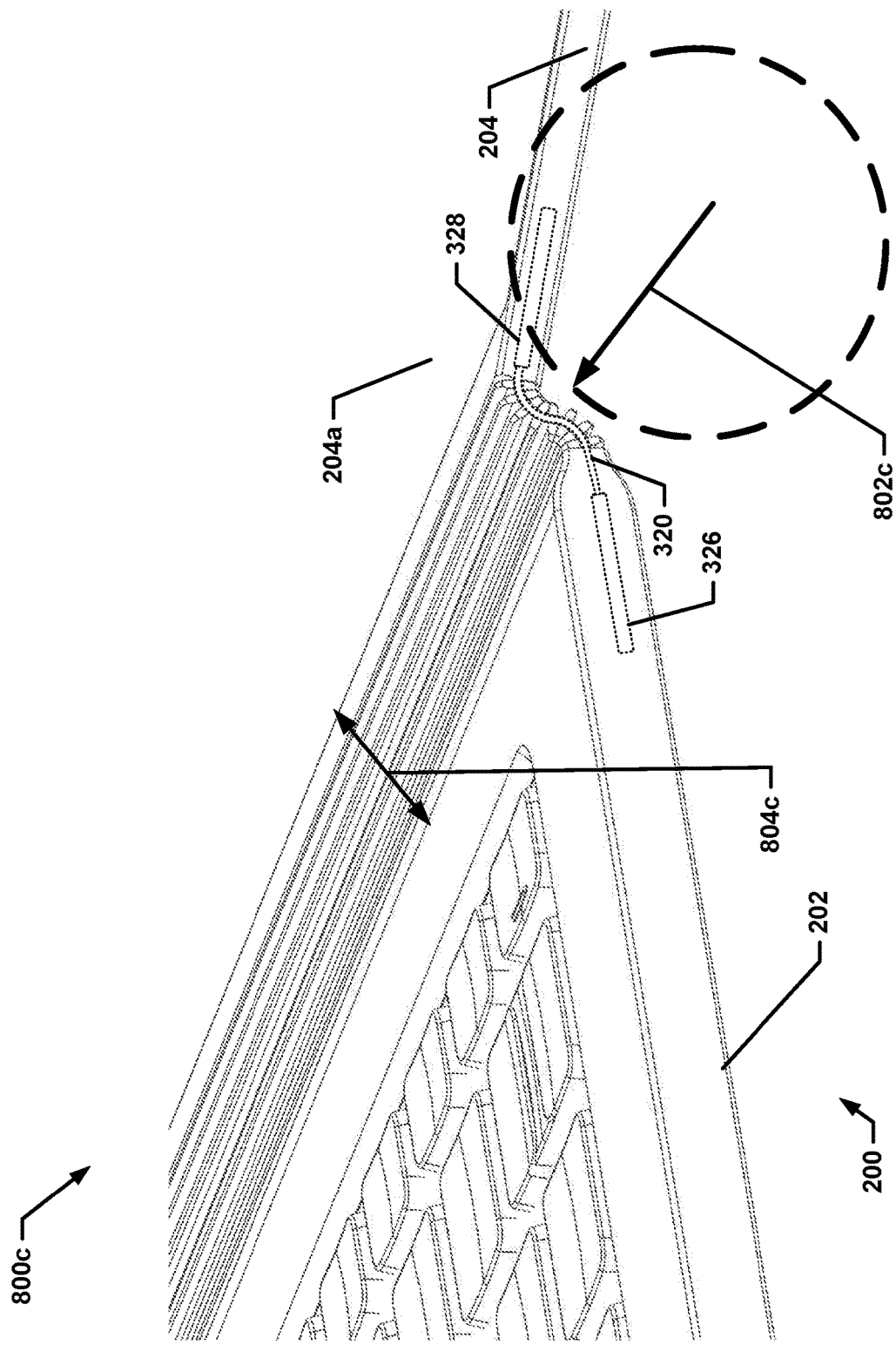
FIG. 8C is a perspective view illustrating an embodiment of the relative angle detection system of FIGS. 3A-3C including the computing device of FIGS. 2A-2C when that computing device is in a tablet configuration.

The method begins at block 602 where a relative angle detection system is provided in idle operation. In various embodiments of block 602, the first chassis member 302 and the second chassis member 304 may be in a first configuration and at a steady state such that the relative angle detection system has not detected movement or a change in the configuration or relative positioning of the first chassis member 302 and the second chassis member 304 over a predetermined time period. Referring now to FIGS. 8A, 8B, and 8C, different configurations of the hinge angle detection system 800a, 800b, and 800c are illustrated that includes the computing device 200, discussed above with reference to FIG. 2A-2C, and the relative angle detection system 300 discussed above with reference to FIGS. 3A-3C. The hinge system 206 may provide for a plurality of different configurations of the base member 202 and the display member 204, including the closed configuration A that is illustrated in FIG. 8A, the laptop/notebook configuration B illustrated in FIG. 8B, and a flat configuration D illustrated in FIG. 8C. In various embodiments the configuration of the base member 202 and the display member 204 may include the tablet configuration C of FIG. 2C. At block 602, the computing device 200 may be provided in any configurations illustrated in FIGS. 8A, 8B, and 8C, and/or any other configurations not explicitly depicted while in steady state for a predetermined period of time.

The method 600 then proceeds to block 604 where it is determined whether an orientation sensor event has been detected. In an embodiment, at block 604 the relative angle detection engine 330 may determine whether it has received an orientation sensor event from an orientation sensor 336 (e.g., a gyroscope, an accelerometer). In an embodiment, the orientation sensor event may indicate that the second chassis member 304 has moved relative to the first chassis member 302. For example, the display member 204 may move from the laptop/notebook configuration B illustrated in FIG. 8B to the closed configuration A illustrated in FIG. 8A. In another example, the display member 204 may move from the closed configuration A illustrated in FIG. 8A to the flat configuration D illustrated in FIG. 8C. In either example, the orientation sensor 336 may provide an orientation event sensor notification to the relative angle detection engine 330. While the examples herein describe movement of base member 202 and the display member 204 relative to each other, an orientation sensor event may include the general movement of the computing device 200 such as, for example, the computing device 200 (as a whole) being flipped, shifted, positioned, rotated, and other otherwise moved to cause an orientation sensor event notification that would be apparent to one of skill in the art in possession of the present disclosure. If, at block 604, no orientation sensor event is detected, then the method 600 returns to block 602.

If an orientation sensor event is detected at block 604, then the method 600 may proceed to block 606 where it is determined whether the relative angle detection system is in a closed configuration (e.g., the closed configuration A of FIG. 8A). In an embodiment, at block 606 the relative angle detection system 300 may monitor the use sensor 337 to determine whether the base member 202 and the display member 204 are in the closed configuration A. For example, the use sensor may include a Hall effect sensor that provides a first signal when the base member 202 and the display member 204 are in the closed configuration A of FIG. 8A, and that provides a second signal when the base member 202 and the display member 204 are in an open configuration such as the laptop/notebook configuration B or the flat configuration D. If, at block 604, the closed configuration is detected, then the method 600 returns to block 602.

If, at block 606, an open configuration is detected, then the method 600 proceeds to block 608 where a timer is set to zero. In various embodiments where the relative angle detection system 300 is determining an optical signal loss on the cable 320 for relative angle detection while the cable 320 may also be used to provide optical signals between the base member 202 and the display member 204 to communicate information and commands to the various computing device components housed in each of the base member 202 and the display member 204 (e.g., display data for the display engine 332 to control the flexible display 310 via the application engine 334), there may be situations where optical signals are not being provided over the cable 320. In those embodiments, it may be beneficial to wait until after an optical signal (that is being used to perform operations other than detecting a hinge angle) is provided over the cable 320 before providing a "dummy" optical transmission (e.g., an angle detection signal) over the cable 320 for use solely in determining the relative angle of the display member relative to the base member. Waiting to use the optical cable to determine the relative angle until after the transmission of an optical signal that is used for something other than determining the relative angle may reduce power consumption, increase available bandwidth on the cable 320, and/or provide other benefits that would apparent to those skilled in the art in possession of the present disclosure. In those situations, the method 600 may include blocks 608, 610, 612 and 614 where it is determined whether an optical signal is being transmitted over the cable 320 for non-relative angle determination purposes. However, when the relative angle detection system 300 includes the cable 320 and that cable 320 is dedicated for detecting a relative angle, then the method 600 may proceed from block 606 and directly to block 616 as described in more detail below.

Thus, returning to block 608, the timer is set to zero and the method 600 proceeds to block 610 where the relative angle detection system 300 determines whether the time has satisfied a predetermined timeout condition. For example, the predetermined timeout condition may be 10 ms, 50 ms, 90 ms, 100 ms, 110 ms, 200 ms, or other predetermined timeout conditions that may be contemplated for a given system. If the timer has not satisfied the time out condition, the method 600 proceeds to block 612 where the relative angle detection system 300 determines whether an optical signal has been provided over the cable 320 from the optical transmitter 326 to the optical receiver 328. If the optical signal has not been provided over the cable 320, the method 600 proceeds to block 614 where the timer is increased by an interval and the method 600 returns to block 610 where the relative angle detection system 300 determines whether the timer has satisfied the timeout condition.

If, at block 610, the timer has satisfied the timeout condition, then the method 600 proceeds to block 616 where a relative angle detection signal is generated. In an embodiment, at block 616, the relative angle detection engine 330 may provide an optical transmission instruction to the optical transmitter 326 to provide the angle detection signal (e.g., a "dummy" optical signal used to determine the relative angle between the display member and the base member) over the cable 320 to the optical receiver 328. The relative angle detection engine 330 may provide the optical transmission instruction over the cable 320 when the optical transmitter 326 and the optical receiver 328 are optical transceivers. However, in various embodiments, the relative angle detection engine 330 may provide the optical transmission instruction over a second cable (e.g., an electrical cable or an optical cable) that is coupled to components housed in the first chassis member housing 312 and the second chassis member housing 314, and/or via a wireless communication system. The optical transmitter 326 may receive the optical transmission instruction and, in response, provide a relative angle detection signal over the cable 320 to the optical receiver 328.

The method 600 may then proceed to block 618 where temperature data of the cable 320 is received. The method 600 may also proceed from block 612 to block 618 when it is determined (at block 612) that an optical signal was provided over the cable 320. In an embodiment at block 618, the relative angle detection engine 330 may retrieve a temperature reading from the temperature sensor 338. In some embodiments, the optical signal provided over the cable 320 may experience variations in optical signal loss due to the variation in the temperature of the cable 320, and thus temperature data for the cable 320 may be retrieved and utilized to compensate for those variances. While block 618 describes retrieving environmental data with respect to temperature, one of skill in the art in possession of the present disclosure will recognize that any other environmental data or conditions of the system (e.g., humidity, pressure on the cable 320 and other factors known in the art) that cause variation in optical signal loss may be retrieved at block 618 and used to compensate for similar variations while remaining within the scope of the present disclosure.

The method 600 then proceeds to block 620 where the optical signal loss caused by the bend radius of the cable is determined. In an embodiment at block 620, the relative angle detection engine 330 may determine the optical signal loss of the received optical signal. For example, the relative angle detection engine 330 may receive optical signal loss from the optical power sensor 406. In another example, the relative angle detection engine 330 may receive the gain control signal provided by the gain control circuit 408. The relative angle detection engine 330 may then determine the optical signal loss and/or gain control signal that is associated with the bend radius of the cable 320, while normalizing the optical signal loss/gain control signal by removing any portion of the optical signal loss/gain control signal caused by the temperature determined in block 618 of method 600 and/or cause by other factors, to arrive at the portion of the optical signal loss/gain control signal caused by the bend radius of the cable 320, which may be referred to herein as bend radius signal loss.

The method 600 then proceeds to block 622 where the relative angle is determined based on the bend radius signal loss. As discussed above, the relative angle may be the angle the base member 202 is relative to the display member 204. In an embodiment at block 622, the relative angle detection engine 330 may use the bend radius signal loss and the hinge angle lookup tables 340 to determine an associated hinge angle of the hinge 206/306. For example, with reference to the graph 700 of FIG. 7 and the relative angle detection system 800a of FIG. 8A where the computing device 200 is in the closed configuration A, the relative angle detection engine 330 may determine that the bend radius signal loss is 9.5 db/min based on the gain control voltage, which corresponds with a bend radius 802a of 4 mm for the cable 320 according to the graph 700 and which may be in the relative angle lookup tables 340. The relative angle detection engine 330 may then determine from the relative angle lookup tables 340 that the bend radius 802a of 4 mm may correspond to a relative angle 804a of 0 degrees. While in the specific example, 4 mm corresponds with a relative angle of 0 degrees and the closed configuration A, other bend radii are contemplated as being associated with 0 degrees and may depend on the dimensions of the computing device 200, the placement of the cable 320 on the computing device 200 (e.g., exterior to the hinge chassis housing, housed within the hinge chassis housing, and in other positions that would be apparent to one of skill in the art in possession of the present disclosure.)

Figure 7:
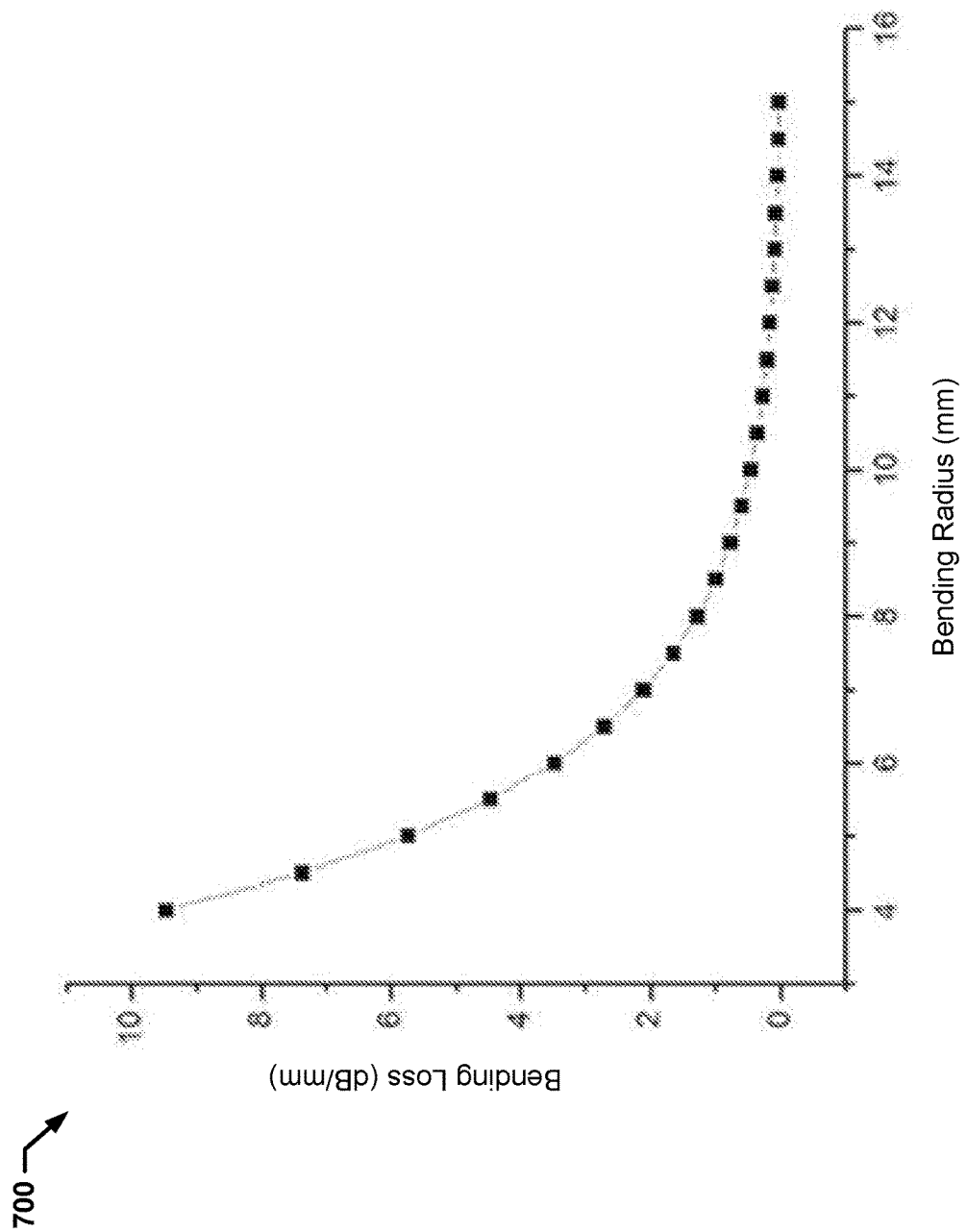
FIG. 7 is an embodiment of bend losses that may be introduced to a cable due to the bend radius of the cable provided using the systems and methods of the present disclosure.

Similarly, with reference to the graph 700 of FIG. 7 and the hinge angle detection system 800*b* of FIG. 8B where the computing device 200 is in the laptop/notebook configuration B, the relative angle detection engine 330 may determine that the bend radius signal loss is 1.5 db/min based on the gain control voltage, which corresponds with a bend radius 802*b* of 8 mm for the cable 320 according to the graph 700 and which may be stored in the relative angle lookup tables 340. The relative angle detection engine 330 may determine from the relative angle lookup tables 340 that a bend radius 802*b* of 8 mm may correspond to a relative angle 804*b* of 100 degrees.

Similarly, with reference to the graph 700 of FIG. 7 and the hinge angle detection system 800*c* of FIG. 8C where the computing device 200 is in the flat configuration D, the relative angle detection engine 330 may determine that the bend radius signal loss is essentially 0 db/min based on the gain control voltage, which corresponds with a bend radius 802*c* of 15 mm for the cable 320 according to the graph 700 and which may be stored in the relative angle lookup tables 340. The relative angle detection engine 330 may determine from the relative angle lookup tables 340 that a bend radius 802*c* of 15 mm may correspond to a hinge angle 704*c* of 180 degrees. In various embodiments, the relative angle detection engine 330 may be configured to calibrate and update the relative angle lookup tables 340 at known relative angles, which will readjust the associations between relative angles and bend radius signal loss to account for aging of components of the relative angle detection system 300, mechanical shifting, and temperature variations.

The method 600 may proceed to block 624, where an instruction is performed based on the relative angle. In an embodiment at block 624, the relative angle detection engine 330, the display engine 332, the application engine 334, and/or any other component of the relative angle detection system 300 may perform instruction or an action based on the relative angle. For example, if the relative angle is less than 15 degrees (e.g., in the closed configuration A) an instruction may be provided to the display engine 332 turn off the power to the flexible display 310. In another example, if the relative angle is greater than 180 degrees (e.g., in the flat configuration D) the application engine 334 may provide an input application (e.g., a digital keyboard on the display screen) to allow the user to provide inputs because the keyboard is inaccessible. In yet another example, if the relative angle transitioned from a hinge angle indicating the closed configuration A to a hinge angle indicating the laptop/notebook configuration B, an instruction may be provided to the display engine 332 turn on the power to the flexible display 310. In yet another example, if the relative angle is 0 and at the closed configuration A as detected by the use sensor 337 (e.g., the Hall effect sensor), the use sensor 337 may provide a closed signal to the relative angle detection engine 330. In response, the relative angle detection engine 330 may update the bend angle lookup table 340 such that the signal loss being detected while the relative angle detection system 300 is in the closed configuration A is updated in the bend angle lookup table 340 if the signal loss has changed. The other entries in the bend angle lookup table 340 may then be renormalized by the relative angle detection engine 330 based on the signal loss detected while the relative angle detection system 300 is in the closed configuration.

Thus, systems and methods have been described that provide for a relative angle detection system that determines a relative angle between a first member and a second member, which solves problems associated with conventional hinge angle detection systems discussed above via the use of a cable that may provide for communication between components while also being used to determine the relative angle. The systems and methods of the present disclosure may determine the relative angle based on signal loss of an optical signal provided through a cable that extends through a hinge system that couples the first member and second member together. Signal loss that is associated with the bend radius of the cable may be determined, and that bend radius signal loss may be compared to entries in a relative angle lookup table to determine an associated relative angle of the first member relative to the second member.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A angle detection system, comprising:
   a first member;
   a second member pivotally coupled to the first member;
   an optical cable connecting an optical transmitter provided on the first member and an optical receiver provided on the second member; and
   an angle detection engine that is configured to:
      determine signal loss of an optical signal provided by the optical transmitter through the optical cable to the optical receiver;
      determine, based on the signal loss, a first angle of the second member relative to the first member; and
      perform, based on the first angle, an instruction, wherein the optical receiver includes a gain control circuit that is configured to amplify the optical signal, and wherein the signal loss of the optical signal is determined based on a gain control signal provided by the gain control circuit that is used to amplify the optical signal.

2. The angle detection system of claim 1, wherein at least one of the optical transmitter and the optical receiver is slidably coupled to the first member and the second member, respectively, such that at least one of the optical transmitter and the optical receiver is in a first position when the second member is positioned at the first angle relative to the second member, and in a second position that is different than the first position when the second member is positioned at a second angle relative to the first member.

3. The angle detection system of claim 1, further comprising:
   a temperature sensor that is coupled to the angle detection engine, wherein the angle detection engine is configured to detect a temperature of the optical cable using the temperature sensor, and wherein the determining the first angle of the second member relative to the first member is based on the temperature of the optical cable.

4. The angle detection system of claim 1, wherein the first member is a first portion of a flexible organic light emitting diode (OLED) display and the second member is a second portion of the flexible OLED display.

5. The angle detection system of claim 1, wherein the optical transmitter is configured to provide an angle detection signal over the optical cable to the optical receiver when no optical signals are provided by the optical transmitter over a time period and an orientation sensor event is detected.

6. The angle detection system of claim 1, wherein the first member and the second member are pivotally coupled to each other by a hinge, and wherein the optical cable is routed through the hinge such that the optical cable has a first bend radius when the hinge pivots the second member to the first angle relative to the first member, and wherein the optical cable has a second bend radius when the hinge pivots the second member to a second angle relative to the first member.

7. The angle detection system of claim 1, further comprising:
a use sensor coupled to the angle detection engine, wherein the angle detection engine is configured to renormalize a bend angle lookup table that stores associations of signal loss to a respective angle of the first member relative to the second member in response to the use sensor providing a standby signal to the angle detection engine when the first member and the second member are positioned in a closed configuration.

8. An information handling system (IHS), comprising:
a display chassis that houses a display device;
a base chassis that houses a processing system;
an optical cable connecting each of the display device and the processing system;
a use sensor coupled to the processing system; and
a memory system that includes instruction that, when executed by the processing system, causes the processing system to provide an angle detection engine that is configured to:
determine signal loss of an optical signal provided by the processing system through the optical cable to the display device;
determine, based on the signal loss, a first angle of the display chassis relative to the base chassis;
perform, based on the first angle, an instruction; and
renormalize a bend angle lookup table that stores associations of signal loss to a respective angle of the base chassis to the display chassis in response to the use sensor providing a standby signal to the angle detection engine when the base chassis and the display chassis are positioned in a closed configuration.

9. The IHS of claim 8, further comprising:
a gain control circuit that is configured to amplify the optical signal, and wherein the signal loss of the optical signal is determined based on a gain control signal provided by the gain control circuit that is used to amplify the optical signal.

10. The IHS of claim 8, wherein the base chassis houses an optical transmitter provided between the processing system and the optical cable and the display chassis houses an optical receiver provided between the optical cable and the display device, and wherein at least one of the optical transmitter and the optical receiver is slidably coupled to the base chassis and the display chassis, respectively, such that at least one of the optical transmitter and the optical receiver is in a first position when the display chassis is positioned at the first angle relative to the base chassis, and in a second position that is different than the first position when the display chassis is positioned at a second angle relative to the base chassis.

11. The IHS of claim 8, further comprising:
a temperature sensor that is coupled to the angle detection engine, wherein the angle detection engine is configured to detect a temperature of the optical cable using the temperature sensor, and wherein the determining the first angle of the display chassis relative to the base chassis is based on the temperature of the optical cable.

12. The IHS of claim 8, wherein the angle detection engine is configured to provide an angle detection signal over the optical cable when no optical signals are provided by the processing system to the display device during a predetermined time period and an orientation sensor event is detected.

13. The IHS of claim 8, wherein the base chassis and the display chassis are pivotally coupled to each other by a hinge, and wherein the optical cable is routed through the hinge such that the optical cable has a first bend radius when the hinge pivots the display chassis to the first angle relative to the base chassis, and wherein the optical cable has a second bend radius when the hinge pivots the display chassis to a second angle relative to the base chassis.

14. A method for determining an angle, comprising:
determining, by a processing system, signal loss of an optical signal provided through an optical cable that is coupled to a first member and a second member, wherein the first member is pivotally coupled to the second member;
detecting, by the processing system, a temperature of the optical cable using a temperature sensor;
determining, by the processing system and based on the signal loss and the temperature of the optical cable, a first angle of the second member relative to the first member; and
performing, based on the first angle, an instruction.

15. The method of claim 14, wherein the determining, by the processing system and based on the signal loss, the first angle of the second member relative to the first member includes determining the signal loss of the optical signal based on a gain control signal provided by a gain control circuit that is used to amplify the optical signal.

16. The method of claim 14, further comprising:
sliding at least one of an optical transmitter and an optical receiver, coupled together by the optical cable, over the first member and the second member, respectively, such that at least one of the optical transmitter and the optical receiver is in a first position when the second member is positioned at the first angle relative to the first member, and in a second position that is different than the first position when the second member is positioned at a second angle relative to the first member.

17. The method of claim 14, wherein the first member is a first portion of a flexible organic light emitting diode (OLED) display and the second member is a second portion of the flexible OLED display.

18. The method of claim 14, further comprising:
providing, by the processing system, an angle detection signal over the optical cable when no optical signals are provided by the processing system during a predetermined time period and an orientation sensor event is detected.

* * * * *